US009155293B2

United States Patent
Crawley et al.

(10) Patent No.: US 9,155,293 B2
(45) Date of Patent: Oct. 13, 2015

(54) RESONATING TRAP FOR CATCHING INSECTS

(75) Inventors: Lantz S. Crawley, Stockton, NJ (US); Keith F. Woodruff, Mountainside, NJ (US); J. Roy Nelson, Pennington, NJ (US)

(73) Assignee: BUGJAMMER, INC., Pennington, NJ (US)

( * ) Notice: Subject to any disclaimer, the term of this patent is extended or adjusted under 35 U.S.C. 154(b) by 461 days.

(21) Appl. No.: 13/527,898

(22) Filed: Jun. 20, 2012

(65) Prior Publication Data

US 2013/0025184 A1    Jan. 31, 2013

Related U.S. Application Data

(60) Provisional application No. 61/512,250, filed on Jul. 27, 2011.

(51) Int. Cl.
| | |
|---|---|
| *A01M 1/14* | (2006.01) |
| *A01M 1/02* | (2006.01) |
| *A01M 1/00* | (2006.01) |
| *A01M 1/10* | (2006.01) |

(52) U.S. Cl.
CPC .................. *A01M 1/02* (2013.01); *A01M 1/023* (2013.01); *A01M 1/14* (2013.01); *A01M 1/145* (2013.01)

(58) Field of Classification Search
CPC ........... A01M 1/00; A01M 1/02; A01M 1/10; A01M 1/14; A01M 1/106; A01M 1/145; A01M 1/023
USPC .......................... 43/114, 115, 107, 132.1, 108
See application file for complete search history.

(56) References Cited

U.S. PATENT DOCUMENTS

| | | | | |
|---|---|---|---|---|
| 395,640 | A | | 1/1889 | Thum et al. |
| 511,689 | A | * | 12/1893 | Dodd .............................. 43/115 |
| 532,454 | A | | 1/1895 | Farnam |
| 552,644 | A | * | 1/1896 | Matthews ........................ 43/114 |
| 552,762 | A | * | 1/1896 | Jerome ........................... 43/114 |
| 561,391 | A | * | 6/1896 | Greene ........................ 43/132.1 |
| 617,243 | A | * | 1/1899 | Fernald et al. .................. 43/115 |
| 628,494 | A | * | 7/1899 | Schriever ........................ 43/115 |
| 667,293 | A | * | 2/1901 | Cherry et al. ................... 43/115 |
| 667,294 | A | * | 2/1901 | Cherry et al. ................... 43/115 |

(Continued)

FOREIGN PATENT DOCUMENTS

| | | | | |
|---|---|---|---|---|
| DE | 10318467 A1 | * | 11/2004 | ............. A01M 1/10 |
| EP | 213369 A1 | * | 3/1987 | ............. A01M 1/14 |

(Continued)

*Primary Examiner* — Darren W Ark
(74) *Attorney, Agent, or Firm* — Leason Ellis LLP (57) ABSTRACT

An insect control device for attracting and capturing insects includes a base; and a resonator column that is in the form of a hollow tube having an open first end and an open second end. The first end is coupled to the base such that the resonator column stands upright therefrom. The second end is substantially open when the resonator column is coupled to the base. The resonator column is constructed and sized and shaped to resonate as a result of natural movements of insects captured on the resonator column resulting in sounds emanating from the captured insects being amplified by the resonator column which in turn serves to attract additional insects to the resonator column. The resonator column is free of electronic components and sound that is generated for attracting insects is generated without electronic components and is a natural sound amplified by the resonator column.

17 Claims, 11 Drawing Sheets

(56) References Cited

U.S. PATENT DOCUMENTS

| | | | | |
|---|---|---|---|---|
| 751,970 A * | 2/1904 | Zierl | | 43/114 |
| 761,202 A * | 5/1904 | Capehart | | 43/114 |
| 807,040 A * | 12/1905 | Mausert | | 43/114 |
| 828,128 A * | 8/1906 | Laube et al. | | 43/115 |
| 862,467 A * | 8/1907 | Gardiner | | 43/114 |
| 885,615 A * | 4/1908 | Handler et al. | | 43/114 |
| 897,919 A * | 9/1908 | Muller | | 43/114 |
| 919,507 A * | 4/1909 | Wiegand et al. | | 43/114 |
| 935,428 A * | 9/1909 | Stranzenbach | | 43/114 |
| 1,015,643 A * | 1/1912 | Serafinski | | 43/114 |
| 1,071,578 A * | 8/1913 | Rese | | 43/114 |
| 1,084,475 A * | 1/1914 | Peck | | 43/115 |
| 1,087,921 A * | 2/1914 | Caldwell | | 43/115 |
| 1,118,845 A * | 11/1914 | Day | | 43/114 |
| 1,137,370 A * | 4/1915 | Wilkens | | 43/115 |
| 1,194,736 A * | 8/1916 | Holden | | 43/114 |
| 1,235,574 A * | 8/1917 | Kirby | | 43/115 |
| 1,480,539 A * | 1/1924 | Grecu | | 43/114 |
| 1,561,832 A * | 11/1925 | Corsi et al. | | 43/115 |
| 1,643,118 A * | 9/1927 | Hahn | | 43/114 |
| 2,258,683 A * | 10/1941 | Ketterer | | 43/114 |
| 2,261,454 A * | 11/1941 | Scheu | | 43/108 |
| 4,168,591 A * | 9/1979 | Shaw | | 43/114 |
| 4,411,093 A * | 10/1983 | Stout et al. | | 43/114 |
| 4,425,733 A | 1/1984 | Ammon et al. | | |
| 4,490,938 A * | 1/1985 | Baker | | 43/114 |
| 4,802,303 A * | 2/1989 | Floyd, III | | 43/131 |
| 4,930,251 A * | 6/1990 | Crisanti | | 43/114 |
| 4,986,024 A * | 1/1991 | Peek et al. | | 43/107 |
| 5,048,224 A * | 9/1991 | Frisch | | 43/114 |
| 5,170,583 A * | 12/1992 | Coaker et al. | | 43/107 |
| 5,203,816 A * | 4/1993 | Townsend | | 43/114 |
| 5,231,790 A * | 8/1993 | Dryden et al. | | 43/114 |
| 5,241,778 A * | 9/1993 | Price | | 43/132.1 |
| 5,311,697 A * | 5/1994 | Cavanaugh et al. | | 43/132.1 |
| 5,628,142 A * | 5/1997 | Kitterman et al. | | 43/114 |
| 5,657,576 A * | 8/1997 | Nicosia | | 43/132.1 |
| 5,907,923 A * | 6/1999 | Heath et al. | | 43/107 |
| 5,943,815 A * | 8/1999 | Paganessi et al. | | 43/107 |
| 6,088,949 A * | 7/2000 | Nicosia et al. | | 43/107 |
| 6,327,811 B1 * | 12/2001 | Yamaguchi et al. | | 43/114 |
| 6,438,894 B1 * | 8/2002 | Silvandersson et al. | | 43/114 |
| 6,467,215 B1 * | 10/2002 | Nelson et al. | | 43/107 |
| 6,481,152 B1 * | 11/2002 | Gray | | 43/114 |
| D467,295 S * | 12/2002 | Andrews et al. | | D22/122 |
| D467,635 S * | 12/2002 | Andrews et al. | | D22/122 |
| 6,568,123 B2 | 5/2003 | Nelson et al. | | |
| 6,647,215 B1 | 11/2003 | Ogle et al. | | |
| 6,655,078 B2 * | 12/2003 | Winner et al. | | 43/114 |
| 6,758,009 B1 * | 7/2004 | Warner | | 43/114 |
| 6,920,716 B2 * | 7/2005 | Kollars et al. | | 43/114 |
| 6,928,769 B2 | 8/2005 | Crawley et al. | | |
| 6,966,142 B1 * | 11/2005 | Hogsette et al. | | 43/114 |
| 8,151,515 B2 * | 4/2012 | Crouse et al. | | 43/136 |
| 8,677,677 B2 * | 3/2014 | Schneidmiller et al. | | 43/113 |
| 9,015,988 B2 * | 4/2015 | Zhang et al. | | 43/114 |
| 2003/0033747 A1 * | 2/2003 | Crawley et al. | | 43/114 |
| 2009/0183419 A1 * | 7/2009 | Harris | | 43/114 |
| 2010/0263260 A1 * | 10/2010 | Engelbrecht et al. | | 43/114 |
| 2012/0167450 A1 * | 7/2012 | Frisch | | 43/114 |
| 2013/0067795 A1 * | 3/2013 | Wesson et al. | | 43/107 |

FOREIGN PATENT DOCUMENTS

| | | | | |
|---|---|---|---|---|
| GB | 2144020 A * | 2/1985 | | A01M 1/14 |
| JP | 04248947 A * | 9/1992 | | A01M 1/02 |
| JP | 08131042 A * | 5/1996 | | A01M 1/14 |
| JP | 11332446 A * | 12/1999 | | A01M 1/14 |
| JP | 2000139317 A * | 5/2000 | | A01M 1/14 |
| JP | 2002360148 A * | 12/2002 | | A01M 1/02 |
| JP | 2004113081 A * | 4/2004 | | A01M 1/14 |
| JP | 2010063450 A * | 3/2010 | | A01M 1/14 |
| JP | 2013153669 A * | 8/2013 | | A01M 1/14 |
| JP | 2013165679 A * | 8/2013 | | A01M 1/14 |
| WO | WO 2010001935 A1 * | 1/2010 | | A01M 1/10 |

* cited by examiner

RESONATING TRAP FOR CATCHING INSECTS

CROSS-REFERENCE TO RELATED APPLICATION

The present application claims the benefit of U.S. patent application Ser. No. 61/512,250, filed Jul. 27, 2011, which is hereby incorporated by reference in its entirety.

TECHNICAL FIELD

The present invention relates to a system and method for catching insects, and in particular, to a device that uses visual cues and a resonating sound generated by the captured insects to lure and capture additional insects.

BACKGROUND

Owing to the prevalence and general annoyance of flying insects, many devices have been developed in the past in an attempt to control their local populations, especially around people perhaps trying to enjoy the outdoors or while indoors. One of the most popular insect-control members is "flypaper", and although this sticky paper can take on many different forms, the basic structure is generally common and includes a substrate or supporting surface, such as a strip or structure made of paper, or a thin strip of foil made of a plastic or metal sheet, onto which a sticky material is applied, such as a pressure sensitive adhesive or a viscous coating including mineral oil. Examples of such fly papers can be found in U.S. Pat. Nos. 395,640, 532,454, 552,644, 552,762, 761,202, 807,040, 862,467, 885,615, 897,919, 919,507, 935,428, 1,194,736, 1,480,539, 1,643,118, 4,425,733.

In addition to a sticky surfactant, fly paper usually includes an alluring sex hormone or chemical and/or an attracting scent (and sometimes a poison) to help attract flying insects into contact with the sticky surface. Once contact is made, the insect cannot escape.

A discussion of historical approaches to addressing insect problems is detailed in U.S. Pat. No. 5,241,778, and hereby incorporated by reference as if set forth in its entirety herein. The '778 patent describes a method for attracting and eradicating insects in which a heartbeat sound attracts insects to a control station. According to the '778 patent, by projecting a heartbeat sound from a speaker, one or more discrete zones can be established which attract mosquitoes and other insects. There remains a need, however, to increase the zone of influence of the established attractant zone as well as its efficacy.

Recent efforts in the art of insect control have included the use of resonators that can be used to lure or repel insects with pressure waves (e.g., waves that mimic a heartbeat). Conventional fly paper constructions dampen or distort the pressure waves and thereby render a resonator less effective. Improvements in the construction of fly paper are needed and the present invention addresses this need. The present Applicant has a number of active resonating insect control devices that are disclosed in U.S. Pat. Nos. 6,928,769; 6,568,123; 6,647,215; D467,635; and D467,295, each of which is hereby incorporated by reference in its entirety. While these devices are suitable for their intended applications, the devices are active devices that use a speaker system to emit waves that attract the insects. Since they are active devices that include electronics, the devices have some degree of complexity.

There is therefore a need to provide a simpler insect control device that still provides superior results without the inclusion of electronics, etc.

SUMMARY

In one embodiment, an insect control device for attracting and capturing insects includes a base; and a resonator column that is in the form of a hollow tube having an open first end and an open second end. The first end is coupled to the base such that the resonator column stands upright therefrom. The second end is substantially open when the resonator column is coupled to the base. The resonator column is constructed and sized and shaped to resonate as a result of natural movements of insects captured on the resonator column resulting in sounds emanating from the captured insects being amplified by the resonator column which in turn serves to attract additional insects to the resonator column. In addition, the resonator column is free of electronic components and therefore, the sound that is generated for attracting insects is generated without electronic components and is a natural sound amplified by the resonator column.

These and other aspects, features and advantages shall be apparent from the accompanying Drawings and description of certain embodiments of the invention.

DETAILED DESCRIPTION OF CERTAIN EMBODIMENTS OF THE INVENTION

Figure 1:
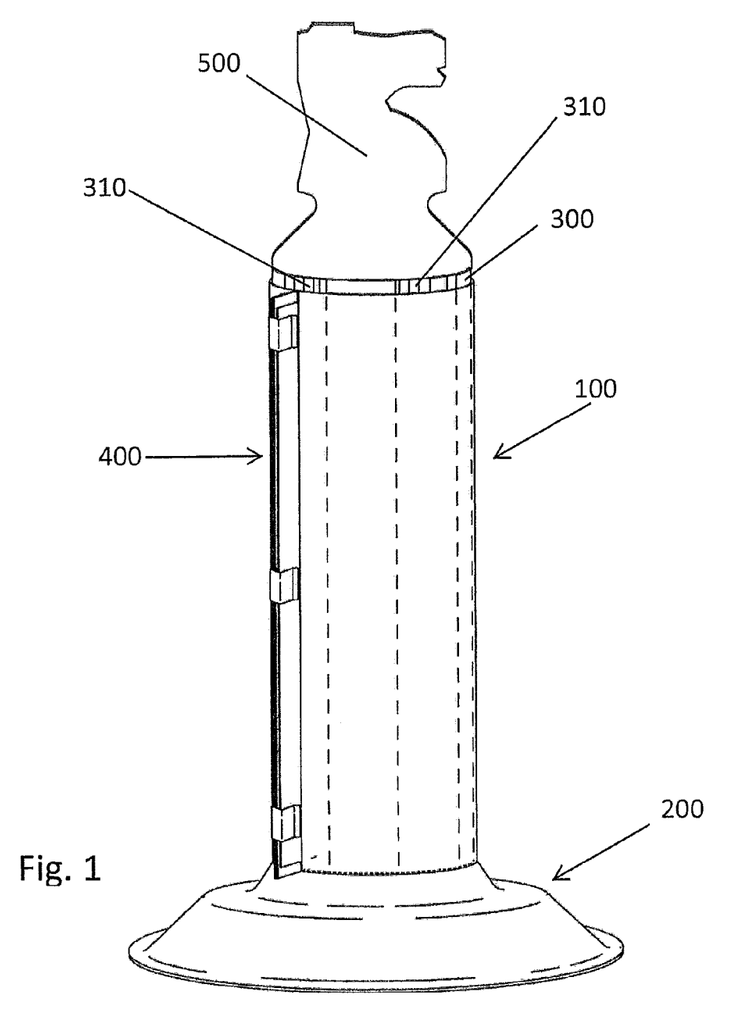
FIG. 1 is a side perspective view of an insect control device according to one embodiment.

FIG. 1 is a side perspective view of an insect control device 100 in accordance with one embodiment of the present invention. The control device 100 of the present invention has utility for various species of bloodsucking insects, particularly insects such as stable flies and blackflies. The invention is specifically described below with regard to an application for attracting and eradicating biting flies of the variety that conventionally feed on humans and animals, although modifications to the device will be clear to one of skill in the art to attract and eradicate biting flies that feed on any particular animal species, or other bloodsucking insects or other pests, as described further below and including but not limited to stable flies, house flies, deer flies, yellow flies, green heads thrips and black flies to name a few.

Unlike previous insect control devices marketed by the present applicant, the insect control device 100 is a passive device in that it is not powered and does not include electronic components at least in one embodiment (shown in FIG. 1). The insect control device 100 is a freely upstanding structure that is designed to be installed on a surface, such as the ground or a table surface, etc., in an area that is in need of insect control. Exemplary locations that meet these criteria include but are not limited to a farm, horse stables, a horse riding arena, residential yard, commercial or public grounds, dog kennel, beaches, camping grounds, fishing boats etc.

Figure 2:
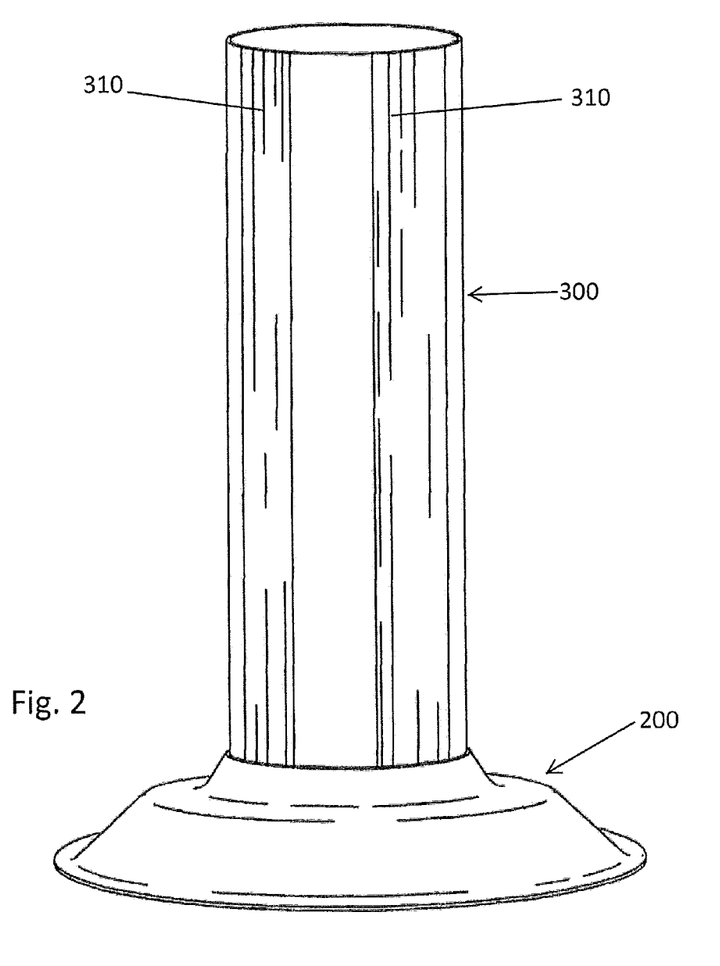
FIG. 2 is a perspective view of certain components, including a base and column, of the device.
Figure 3:
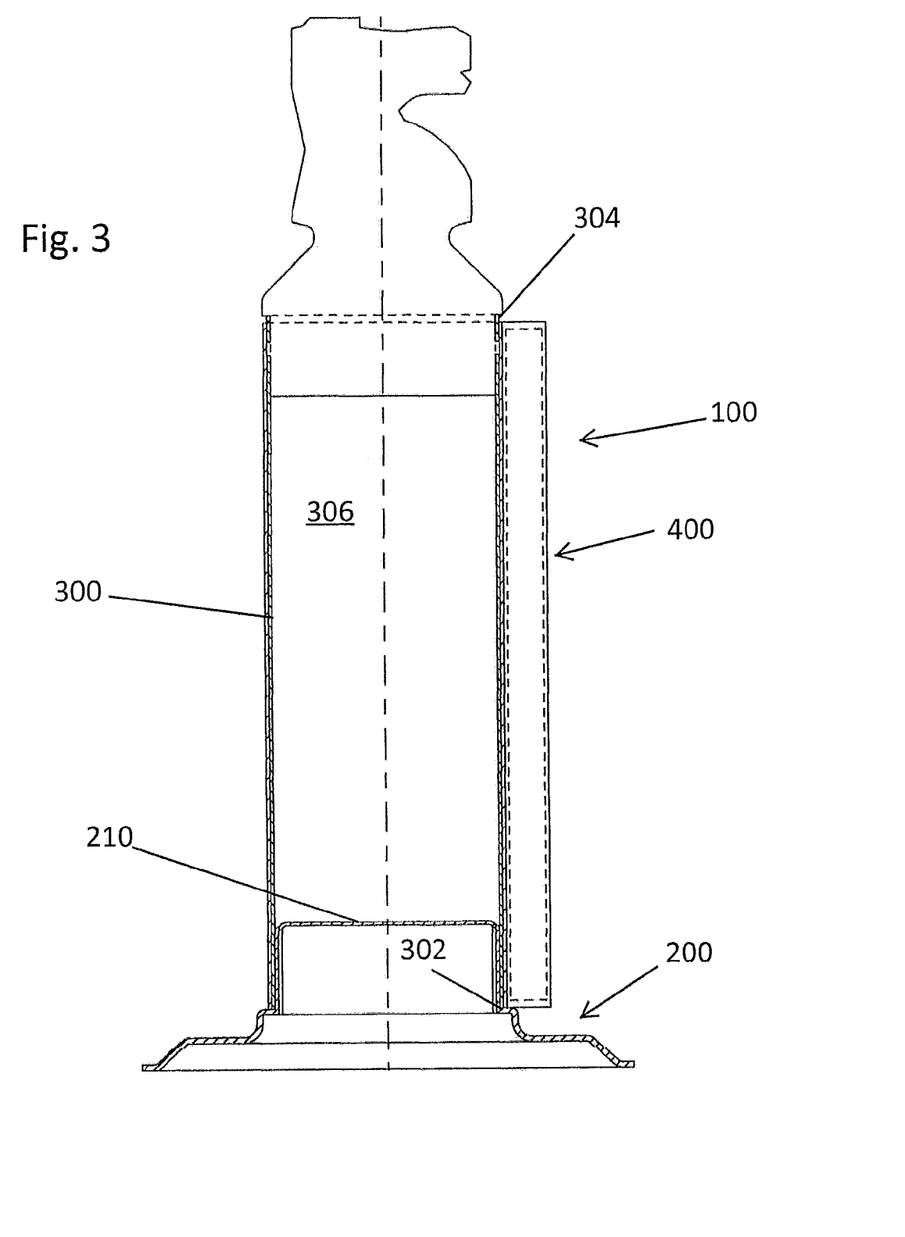
FIG. 3 is a cross-sectional view of the insect control device.

As shown in FIG. 1-3, the illustrated insect control device 100 is formed of several parts that are mated together to form the assembled device 100. In particular, the insect control device 100 includes a base 200 and a resonator column 300 that is coupled to the base 200 such that it stands upright and is supported by the base 200. The illustrated base 200 is formed of a plastic material and includes different concentric sections. For example, the base 200 can include an innermost section 210 that is circular in shape and is size and shaped so as to form a mechanical fit (e.g., a friction fit) with the resonator column 300. The innermost section 210 thus represents a boss that is received within an opening of the resonator column 300.

The coupling between the resonator column 300 and the base 200 allows for easy, yet secure, attachment of the resonator column 300 to the base 200. It will be appreciated that any number of other coupling means can be used, including both adhesive based means and mechanical attachment that uses fasteners to couple the resonator column 300 to the base 200.

The illustrated base 200 has a black color, such as a black colored plastic part. In addition, the base 200 can include a drain hole since the resonator column is open ended and is open to the elements, such as rain. Any rain collected within the resonator column 300 drains through the drain.

The resonator column 300 includes a first end 302 and an opposing second end 304 with the first end 302 being coupled to the base 200. The resonator column 300 is formed to have a continuous surface and has a hollow interior 306. The illustrated resonator column 300 is a tubular structure that is open at both the first end 302 and the second end 304. The resonator column 300 can be formed to have any number of different shapes, with the illustrated resonator column 300 having a cylindrical shape. However, other shapes are possible for the column 300 so long as they have the necessary resonating characteristics, described herein, that attract insects.

The material from which the resonator column 300 is made up of is selected so that the desired degree of resonance is achieved in the intended application as described herein. The resonator column 300 can be formed of a plastic material that has the desired material characteristics and has a thickness that permits the column 300 to resonate when the conditions described herein are present. In one embodiment, the resonator column 300 is formed of a PVC (polyvinyl chloride) material and is a tubular structure that is open at each end.

The resonator column 300 can be formed that have different dimensions including tubular structures that have diameters in the range of 2" or greater have been found to be suitable. In the illustrated embodiment, the resonator column 300 has a diameter of about 4.00". The length of the resonator column 300 can vary depending upon the application. However, suitable lengths include but are not limited to a length between about 8 inches and 36 inches. In one embodiment, the resonator column 300 has a length of about 12 inches.

In accordance with one aspect of the present invention, the outer surface of the resonator column 300 has a pattern that attracts insects. More specifically, the outer surface of the resonator column 300 has a striped pattern formed with alternating white and black bands or stripes 310.

The widths of the stripes 310 (vertical bands) can vary as between each band or between bands of one color (e.g., white) and bands of another color (e.g., black). The vertical bands 310 of contrasting color provides a visual cue to the insects and more specifically, it is reasoned that the vertical bands 310 represent "legs" in the eyes of the insect which is one of the most preferred targets of certain insects, such as flies and the like. The stripes 310 can be formed in any number of different ways including painting or otherwise coloring the outer surface of the column 300 or by applying colored decals (e.g., black stripes) to an otherwise colored column 300 (e.g., a white colored column 300).

The striped pattern of the resonator column 300 thus represents a visual cue that attracts insects to the resonator column 300.

In accordance with the present invention, when the resonator column 300 is coupled to the base 200, the resonator column 300 represents a resonating structure that exhibits resonance in that it resounds or reverberate and amplifies the sounds of insects that are in direct or indirect contact with the resonator column 300, thereby attracting additional insects. The resonator column 300 is thus constructed so as to vibrate and generate sound waves that are amplified within the resonator column and transmitted therefrom to attract other insects.

In accordance with one embodiment of the present invention, a disposable outer resonating element 400 that is coupled the resonator column 300 and is constructed such that sound waves are transferred from the outer resonating element 400 to the resonating column 300. It will therefore be appreciated that both the outer resonating element 400 and the resonating column 300 resonate under certain events as described below to provide an effective resonator. The outer resonating element 400 is therefore formed of a material that preferably has an optimum flexural modulus so not as to dampen the sound emanating from the insect(s) caught on the outer resonating element 400 which acts as a means for attracting and capturing the insects. As described herein, the sound (vibrations) generated by a captured insect(s) is amplified and transmitted by the resonating column 300 and this sound attracts other insects, thereby resulting in the other insects also being captured on the outer resonating element 400.

The outer resonating element 400 can be in the form of a thin walled, durable material such as polypropylene, HDPE, PET, PETE, vinyl, or other material. The outer resonating element 400 can be paper thin yet durable, although biodegradable materials can also be used so long as it produces an effective resonator.

The outer resonating element 400 is thus a cover that at least partially covers the outer surface of the resonating column 300. The outer resonating element 400 has an outer face 410 that is covered with an adhesive material (e.g., an adhesive film or layer) or the substrate 400 can be formed such that it integrally has adhesive characteristics along its outer surface.

The adhesive material can be selected from any of several commercially available insect-glue compositions or it can be formulated by one skilled in the art.

The adhesive material also can be clear or appropriately colored, such as a color that has been shown to attract flying insects.

The material properties of the supporting outer resonating element (substrate) 400 are carefully selected to achieve the desired results and to optimize capturing insects. As set forth in detail in Applicant's previous patent, there is a relationship between the flexural modulus and the thickness of a material to be used (as measured in a direction normal to the insect-engagement surface (outer surface of the substrate 400) which permits selection of a suitable material composition for the substrate 400. Likewise, there is a relationship that permits a suitable substrate to be specified in terms of thickness when a material composition has already been selected. The relationship permits the substrate to be generally optimally adapted to radiate pressure waves from the resonator column 300 to which it can be coupled in order to lure insects when placed into service. Details concerning these relationships and preferred flexural modulus are set forth in the patents incorporated herein.

The substrate 400 can be in the form of a plastic sheet (e.g., low density polyethylene (LDPE)) that has a thickness of about 0.5 mil. The thickness of the substrate 400 is selected such that dampening of the sound emanating from the insect does not result.

In yet another embodiment, the adhesive material 420 can be applied directly to the outer surface of the resonator column 300. For example, the adhesive material can be applied directly to the outer surface of the resonator column 300.

It will therefore be appreciated that the resonator column 300 and the outer resonating element 400 are selected and constructed from materials and have dimensions such that when an insect is caught on the adhesive material 420, the combined element 400 and resonator column 300 amplifies and transmits vibrations from the captured insect and thereby attract other insects. The present application has found that the vibrations caused by the captured insects create sound waves that attract other insects to make contact with the resonator adhesive material. This results in more and more insects being drawn to the resonator and captured on the adhesive material or killed by the contact pesticide.

The outer resonating element 400 can be coupled to the resonating column 300 using any number of conventional means as described herein. In addition, the size and shape of the outer resonating element 400 can differ from the resonating column 300. For example, the outer resonating element 400 can have a generally cylindrical shape when coupled to the resonating column 300. Initially, the outer resonating element 400 can be provided in sheet form or some other form, such as a folded structure, that is then manipulated and shaped to fit around the resonating column 300. Other potential designs for the resonator include a bell or a frustoconical shape. The outer resonating element 400 can be transparent or semi-transparent to allow the pattern of the underlying resonating column 300 to be visible. For example, the stripes of the resonating column 300 which act as a visual cue are visible. Alternatively or in addition, the outer resonating element 400 can include a pattern.

In one embodiment (FIGS. 3-5), the outer resonating element 400 is affixed to the resonating column 300 by means of mechanical fasteners that allow direct attachment between the top edge of the element 400 to the top edge of the resonating column 300 and also, the bottom edge of the element 400 to the bottom edge of the resonating column 300.

Figure 4:
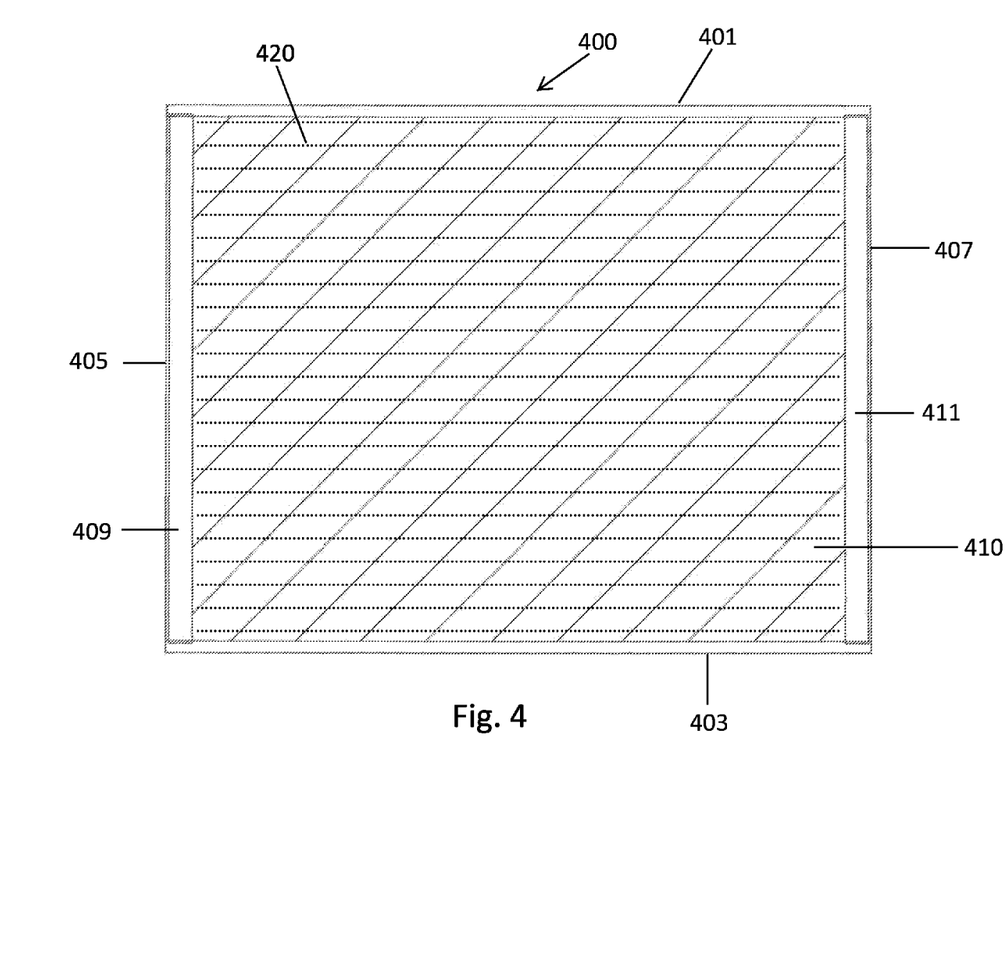
FIG. 4 is a side elevation view of an outer resonating element.
Figure 5:
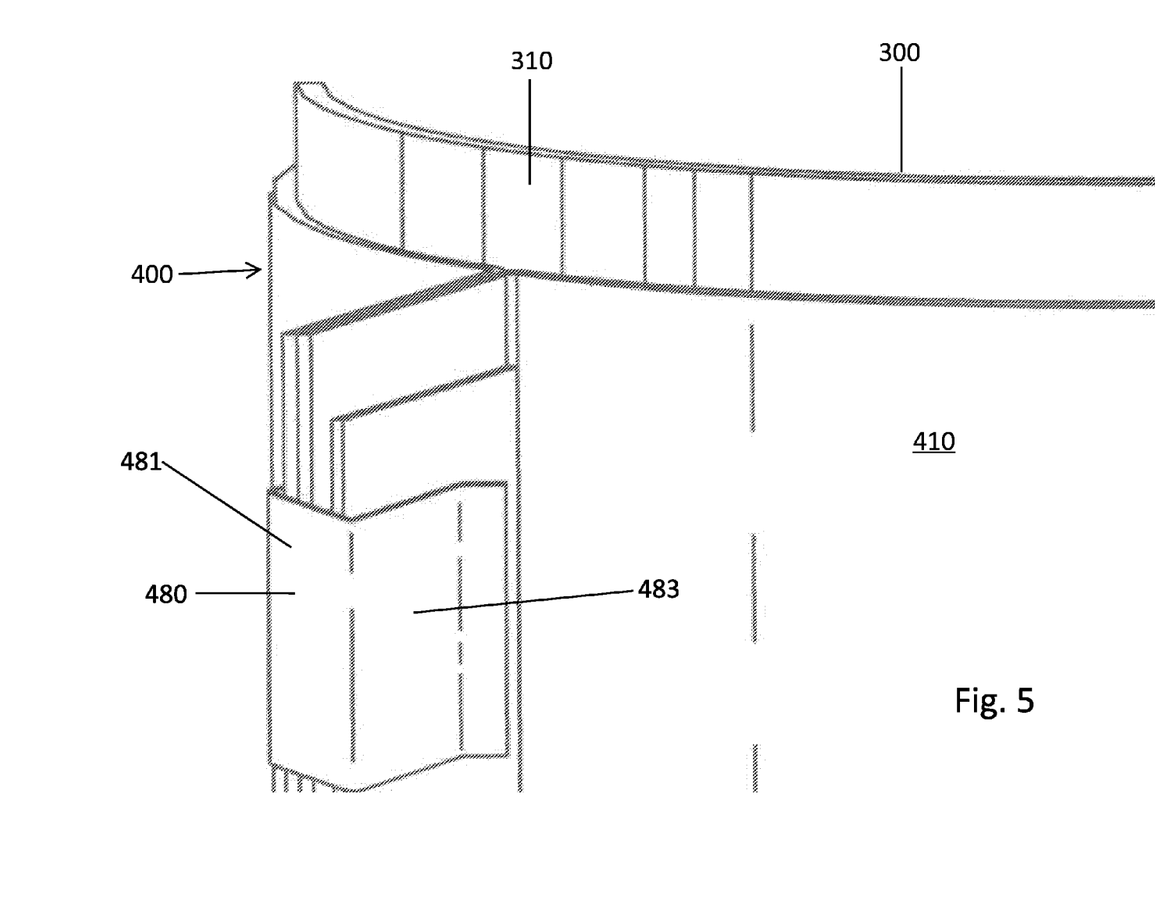
FIG. 5 is a perspective view a fastening member used to attach the outer resonating element to the column.

In the embodiment shown in FIG. 3-5, the outer resonating element 400 is affixed to the resonating column by means of mechanical fasteners 480. The resonating element 400 includes a top edge 401, bottom edge 403, a first side edge 405, and a second side edge 407. The first side edge 405 includes a first stiffening member 409 and the second side edge 407 includes a second stiffening member 411. The stiffening members 409, 411 can be in the form of elongated (flat) rigid structures that extend along a length of the side edge. For example, the stiffening member can be in the form of a flat structure that extends along substantially the entire length of the side edge. The stiffening member can be formed of any number of different materials, including but not limited to a plastic, wood, etc. The stiffening members 409, 411 allow for easy attachment of the element 400 about the column 300. The stiffening members 409, 411 also provide a member to grip and hold when manipulating and rolling the element 400 about the column 300.

The stiffening members 409, 411 provide rigidity to the element 400 and allow the user to grasp the element 400 and dispose it around (about) the column 300. The stiffening members 409, 411 also provide a means for attaching the element 400 to the column 300. In particular and as shown in FIGS. 3 and 5, the stiffening members 409, 411 can be brought together and placed in contact with one another and brought into parallel relationship with one another. The element 400 is thus sized such that when the element 400 is wrapped around the column 300 and the stiffening members 409, 411 are brought into contact with one another such that the stiffening members 409, 411 extend radially outward from the column 300.

The fastening member 480 can be in the form of a clip that is sized to engage the stiffening members 409, 411 that are disposed adjacent one another. The fastening member 480 can thus be in the form of a flexible plastic clip that has a base wall 481 and two legs 483 that extend outwardly from the base wall 481. A space is formed between the legs 483 and this space is sized to receive the two stiffening members 409, 411 that are disposed adjacent one another. The width of the space is thus less than or equal to the thickness of the stiffening members 409, 411 so as to form a frictional fit therebetween. Once the stiffening members 409, 411 are brought into contact with one another (side-by-side), the fastening member 480 is inserted over the stiffening members 409, 411. The clip 480 thus holds the stiffening members 409, 411 in place and ensures that the element 400 is secured tightly around the column 300 so as to remain in place about the column 300.

The clip 480 thus allows easy attachment and detachment of the element 400 from the column 300, thereby permitting disposal of the element 400. The element 400 can be provided in any number of different package arrangements including being folded or rolled. As shown in FIG. 1, a plurality (e.g., three) clips 480 can be used.

To release, the fasteners are simply removed.

In yet another embodiment, at least one edge (e.g., a top edge) and preferably both top and bottom edges of the outer resonating element 400 can include integral clips (e.g., like a paperclip) that can be opened and receive one end of the resonating column 300.

The adhesive material 420 is covered by a protective release cover and therefore, once the outer resonating element 400 is coupled to the resonating column 300, the protective release cover is removed to expose the adhesive material 420.

In yet another embodiment, the outer resonating element 400 can be formed of a material has some degree of resiliency so as to allow the outer resonating element 400 to stretch and be placed over the outer surface of the resonating column 300 and when released, a snug fit is formed between the outer resonating element 400 and the resonating column 300.

Figure 6:
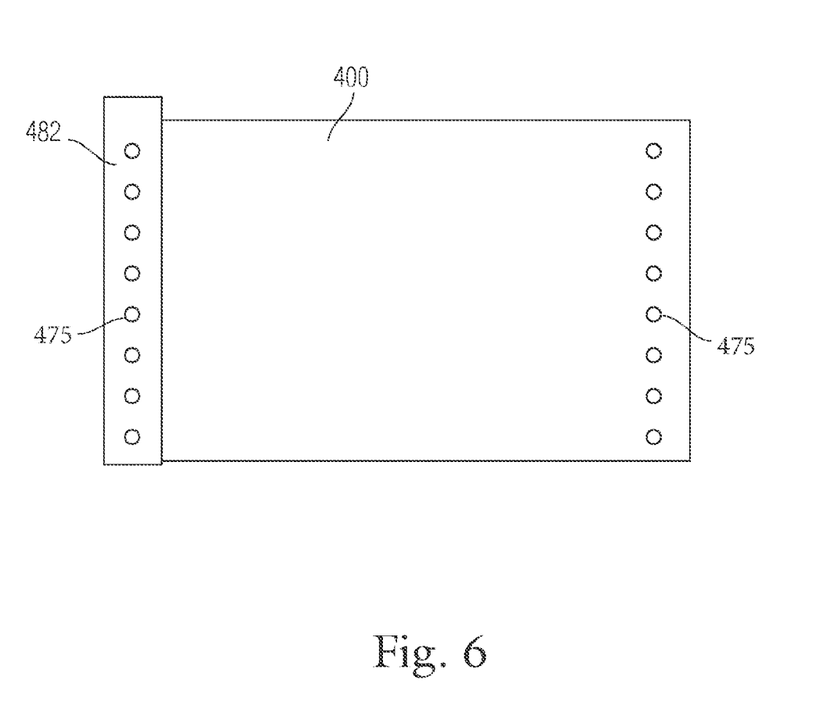
FIG. 6 is a side elevation view of an outer resonating element (cover) according to one embodiment.

In yet another embodiment (FIG. 6), the outer resonating element 400 is formed of two different types of material in that one or more end sections 482 at one or both ends have greater resiliency than the center portion. The end section 482 includes complementary mechanical fasteners 475, such as hook and loop material, snaps, male/female fasteners, etc. The greater resiliency in the one or more end sections allows the user to in effect stretch the end section into position where it engages fasteners, thereby securely and snugly coupling the outer resonating element to the resonating column 300.

For example, U.S. Pat. No. 6,928,769 discloses fasteners zones that include fasteners for attaching the two ends of the structure so as to form a continuous substrate. The outer resonating element 400 can be formed in the same way. Once the user attaches the two ends of the outer resonating element 400 to themselves to form a snugly fit outer resonating element 400, the protective release cover over the adhesive material can be removed.

Figure 7:
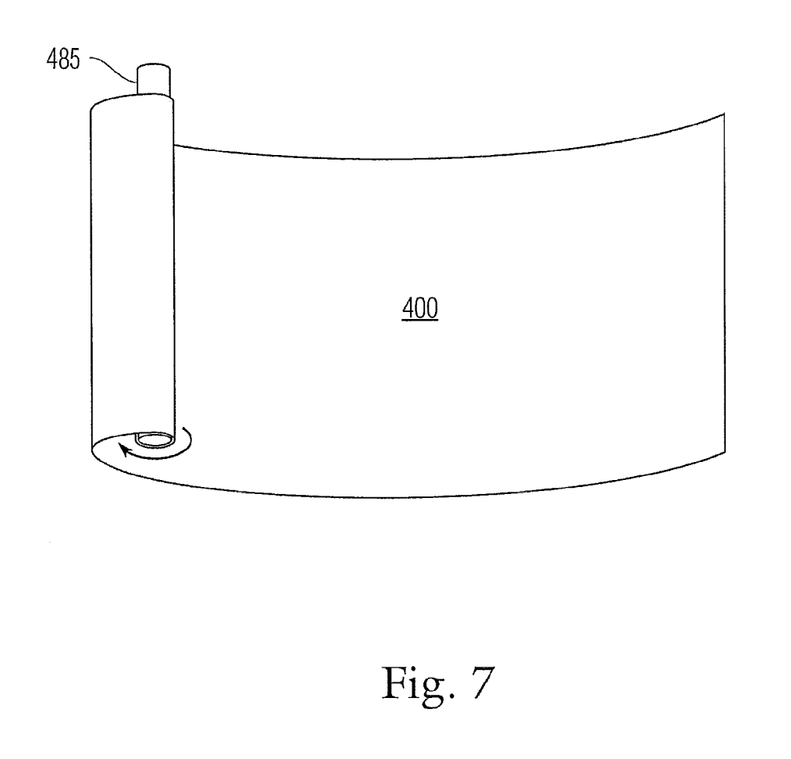
FIG. 7 is a side perspective view of an outer resonating element (cover) according to one embodiment.

In yet another embodiment (FIG. 7), the outer resonating element 400 can include a self-adjusting means 485 that allows the length (or other dimension) of the outer resonating element 400 to be adjusted about the resonating column 300. For example, an elongated rod 485 or the like can be provided and fixedly attached to one end of the outer resonating element. The elongated rod extends above the top edge of the outer resonating element 400 and is free for grasping by the user. The outer resonating element 400 is initially wrapped around the outer surface of the resonating element 300 and is coupled thereto and then the elongated rod is rotated in a direction that causes the outer resonating element 400 to fold on top of itself, thereby reducing the overall length of the outer resonating element 400. In this way, the elongated rod functions to take up and slack in the outer resonating element 400 and provide a more snug fit between the outer resonating element 400 and the resonating column 300. Once again, the fit and coupling between the outer resonating element 400 and the resonating column 300 should be such that the vibration of the outer resonating element 400 is effectively transferred to the resonating column 300 which then amplifies such sound.

Figures 8, 8A:
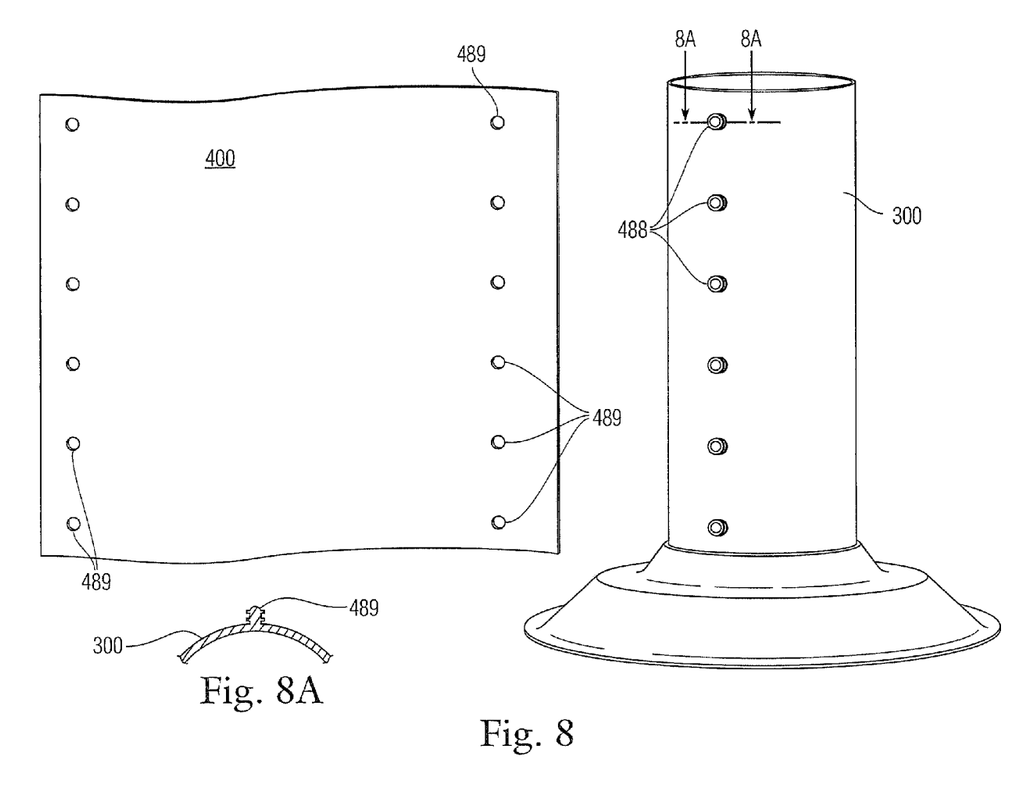
FIG. 8 shows an outer resonating element of one embodiment and a resonating column having complementary mating features.
FIG. 8A is cross-sectional view taken along the line 8A-8A of FIG. 8.

In yet another embodiment, the resonating column 300 includes a first fastener and the outer resonating element 400 includes a second fastener that mate together to securely attach the two to one another. For example and as shown in FIGS. 8 and 8A, the resonating column 300 can have a series of protrusions 488 formed thereon and in particular, a column of protrusions can be integrally formed as part of the column 300. Each end of the outer resonating element 400 can have a complementary series of openings 489 formed therein that receive the protrusions 489 to couple the outer resonating element 400 to the resonating column 300.

In yet another embodiment the edges of the outer resonating element may be pre glued for fused (sonic welding) together in a manner the upper radius of the wrap is smaller than the lower radius of the wrap which allows the element 400 to be placed directly over a frusticonical shape and drop to a snug fit around the resonator.

The protrusions can be formed in the shape of rivets with enlarged heads that serve the capture the outer resonating element 400 when the rivets pass through the openings and clear the other face of the outer resonating element 400. The enlarged heads capture and hold the outer resonating element 400 in place and prevent the outer resonating element 400 from falling off or from otherwise becoming adversely spaced from the outer resonating element 400 so as to decrease the rate of transmission from the outer resonating element 400 to the resonating column 300. Alternatively, as shown, the protrusion 489 can include a pair of space flanges (annular) that define a channel or groove that receives the element 400.

To install the outer resonating element 400 to the resonating column 300, the openings formed along one end of the outer resonating element are placed in registration with and over the protrusions. Subsequently, the outer resonating element 400 is wrapped around the resonating column 300 and then the openings at the other end of the outer resonating element are placed in registration with and over the protrusions.

Figures 9, 9A:
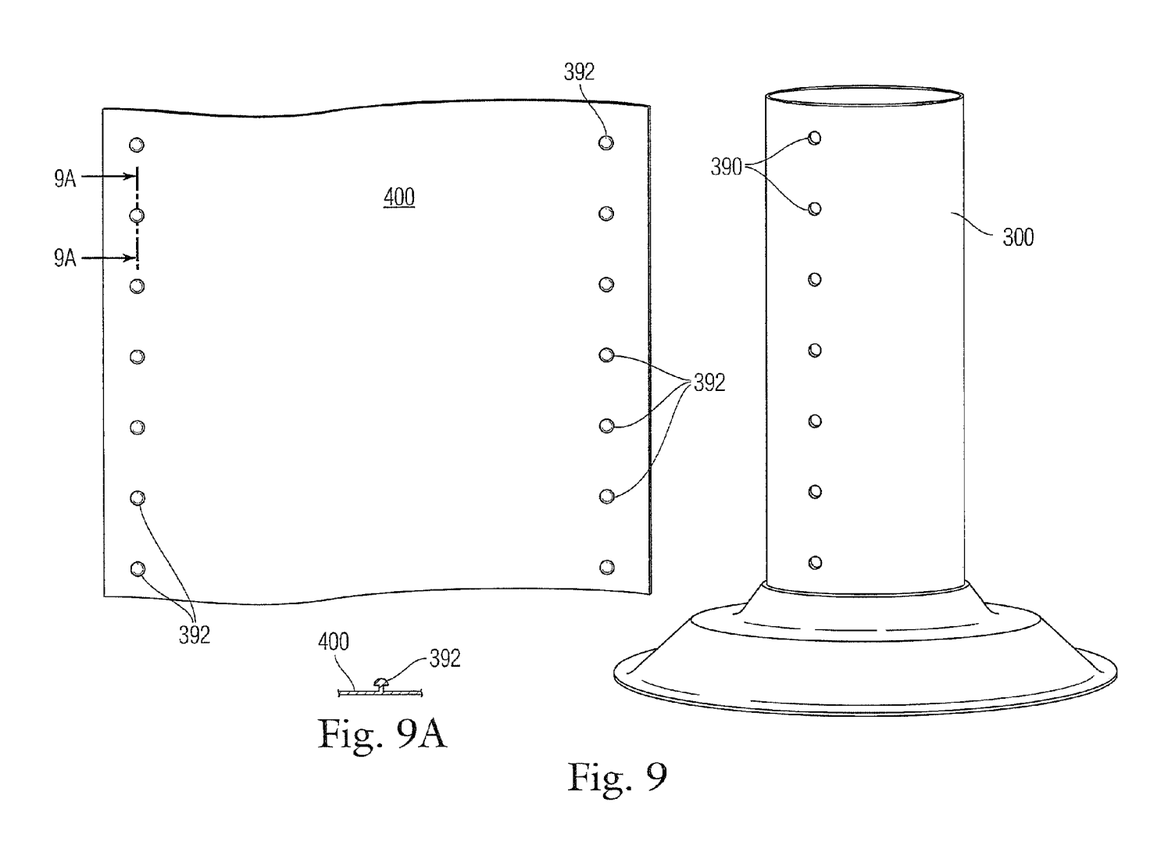
FIG. 9 shows an outer resonating element of one embodiment and a resonating column having complementary mating features.
FIG. 9A is cross-sectional view taken along the line 9A-9A of FIG. 9.

Similarly as shown in FIGS. 9 and 9A, the opposite arrangement can be true in that the resonating column 300 can have a series of openings 390 formed therein and in particular, a column of openings 390 can be formed in the resonating column 300. The ends of the outer resonating element 400 include complementary protrusions 392 that mate with the resonating column 300. For example, one end of the outer resonating element 400 can include a row of protrusions 392 (e.g., rivet like structure) that are received within the openings 390 formed in the resonating column, thereby coupling this end to the resonating column 300. Next, the outer resonating element 400 is wrapped about the resonating column 300 and the other protrusions are placed in registration with the opening and can be constructed to mate with the protrusions formed at the other end of the outer resonating element 400. In this way, the outer resonating element 400 is snugly fit about the outer surface of the resonating column 300.

Figures 10, 11:
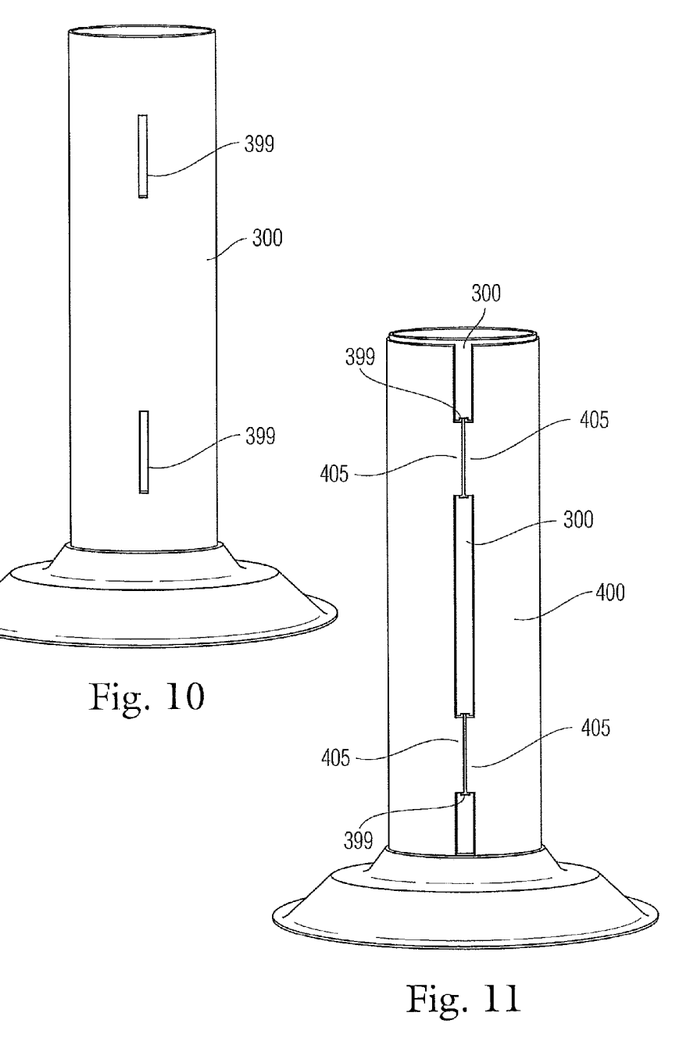
FIG. 10 is a side perspective view of a resonating column according to another embodiment.
FIG. 11 is a side perspective view of an outer resonating element coupled to the resonating column of FIG. 10.

In another embodiment shown in FIGS. 10 and 11, the outer resonating element 400 can include one or more stamped cut outs in the form of tongues 405 that is constructed to mate with slots 399 formed in the resonator column 300 to coupled the two snugly together. For example, each end of the element 400 can include two or more tongues 405 that fit within slots 399 so as to snugly couple the element 400 to the column 300.

The degree of coupling between the outer resonating element 400 and the resonating column 300 is such that the vibrations generated by the insects captured on the outer resonating element 400 are effectively transferred to the resonating column 300 which in turn amplifies this sound. In other words, the outer resonating element 400 does not dampen the sound waves generated by the captured insects. According to the present invention, the vibration of the captured insect is effectively transferred and amplified by the resonator.

In yet another aspect of the present invention, only selected sections of the outer resonating element 400 are covered with the adhesive material 420 and other sections of the outer resonating element 400 are covered with another material, such as a pesticide treated material. Such pesticide treated materials are known and can be used to eliminate insects, such as flies, when they are near or make contact with the treated surface. These pesticides include but are not limited to cyhalothrin, zeta-cypermenthrin, bifenthrin, permethrin, etc.

In yet another embodiment, an inner surface of the outer resonating element 400 can have a first adhesive material disposed thereon that has adhesive characteristics to allow the outer resonating element 400 to be detachably adhered to the outer surface of the resonating column 300. The adhesive material formed on the inner surface has a much lower tackiness compared to the adhesive material that is used to capture the insects.

Figure 12:
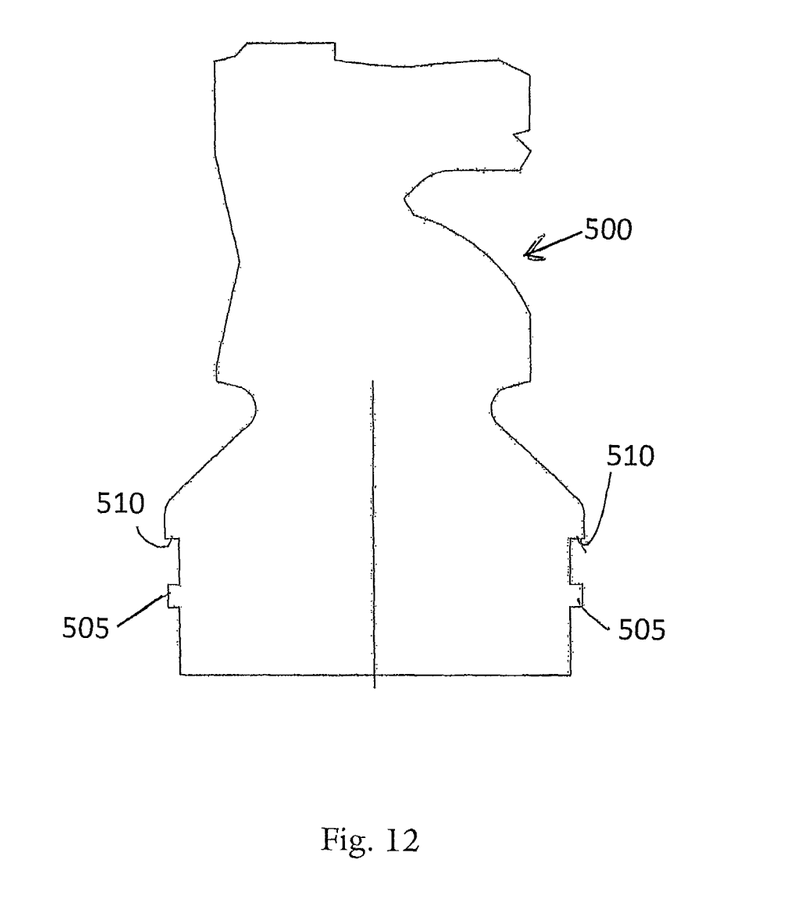
FIG. 12 shows a visual cue member according to one embodiment.

In addition and in accordance with the present invention, the insect control device 100 includes a number of accessories that promote the attraction and capture of the insects. For example as shown in FIGS. 1 and 12, the insect control device 100 can include a top visual cue member 500 that sits atop the open second end 304 of the resonator column 300. However, the top visual cue member 500 does not completely enclose the open second end 304 of the resonator column 300. For example, the visual cue member 500 has a body that includes one or more coupling members, such as tabs 505, that are received into corresponding openings or notches formed in the resonating column 300 resulting in the member 500 being upstanding relative to the column 300. To couple the member 500 to the resonator column 300, the resonator column 300 can be flexed so as to permit the reception of the tabs into the openings. A shoulder 510 is formed above the tabs 505 and seats against second end 304 to support the member 500 on the column 300.

FIG. 12 shows one exemplary visual cue member 500 in the form of an animal head and in particular, the visual cue member 500 is in the form of a shape or profile of a horse's head. In other embodiments, the visual cue member 500 can be in the form of a head of a cow, sheep, elephant, dog, cat, etc. The member 500 extends across the open second end of the resonator column such that it passes through the center of the resonator column 300. It will be appreciated that the dimensions of the member 500 can increase in an upward direction since only the bottommost section needs to be constructed to mate with the resonator column 300.

The visual cue member 500 can be formed from any number of different materials including a plastic material, wood, a composite, etc., and can be molded or stamped or otherwise formed. In addition, the visual cue member 500 is colored so as to facilitate the attraction of insects. The color of the visual cue member 500 can be but is not limited to black, blue, green or white and provides an additional visual cue to attract insects.

In one embodiment, the visual cue member 500 can be a disposable member and can include adhesive material at least partially thereon for capturing insects. However, it will be appreciated that the visual cue member 500 also serves as a handle for carrying the device 100 in an area which is free of adhesive. Thus, the user is not exposed to the adhesive material 420 that surrounds the resonating column 300.

In addition, another insect control device having a different form, such as pesticide treated materials, can be disposed proximate to the device 100 within a zone of insect control to increase the insect control results since the device 100 attracted the insects to the area (zone of insect control) and increased the resident time on the surface of the pesticide treated material.

It will be appreciated that the device of the present invention, unlike Applicant's previous products, is a passive device that includes at least one substantially open ended resonator column that is constructed so as to amplify the vibrations caused by trapped/captured insects, thereby causing a sound that attracts additional insects.

It will also be understood that the resonator column 300 can be used without the base 200. In particular, the resonator column 300 can be hung from a support structure such as a fence or post. Since the resonator column 300 is an open tube, it can be supported by a wire, string, hooks or the like or other fasteners which attach to or pass through one end of the tube, supporting the tube in a vertical position. The wire, string, hook or the like can be attached to a mobile supporting structure so as to allow easy transport and placement of the insect capturing device in a desired location. It will also be appreciated that the base 200 can be eliminated and the insect capturing device can be supported in a horizontal orientation.

The attached appendix includes additional drawings of the various insect control devices of the present invention in use.

Additional points of the present invention are noted below: (1) an insect control device where in the body of the device is capable of functioning as a resonator and can amplify the sound of insects caught on the surface or part of the surface by a sticky material directly applied to the surface or contained on a sticky wrap of selected material and thickness designed to attach to, or fit snugly on all or part of the resonator surface; (2) an insect control device where the device is used to draw insects to a pesticide treated material placed on or near the device and thereby improve the overall performance of the pesticide treated material by attracting more insects to and increasing the contact time of the insects on the pesticide treated surface; (3) the resonator is bell or frusta-conical in shape and is supported by an appropriate column which allows it to freely vibrate; (4) the resonator is an irregular shaped device such as a guitar, violin or the like; (5) the resonator is a tube of appropriate material, thickness and length, which when an insect is caught on a sticky material on or attached to the surface, can amplify and transmit vibrations from the captured insect and there by attract other insects, wherein the tube is supported by a base which fits into or over one end of the tube; (6) the resonator is an open tube and is supported by a wire, string, hooks or the like which attaches to or passes through one end of the tube, supporting the tube in a vertical position, wherein the wire, string, hook or the like is attached to a mobile supporting structure so as to allow easy transport and placement of the insect capturing device in a desired location; (7) the resonator is an open tube and supported by wire, string, hooks or the like in a horizontal position, wherein open tubes may have end covers of screens, grids or the like to prevent the entrance of unwanted insects, spiders or other creature (i.e. snakes) to the inside of the tube; (8) only part of the surface is covered with a sticky material and the adjacent surface or areas on or near the insect control device hold a pesticide treated material, such as λ-cyhalothrin, Zeta-cypermethrin, bifenthrin, or permethrin; (9) the sticky strip functions as an indicator of insect attraction, assuring consumers that the device is working and that insect are drawn to the pesticide(s) treated material; (10) the sticky strip may be attached to the surface of the resonator by a number of means known to one skilled in the art, so that the vibration of the captured insect is efficiently transferred and amplified by the resonator; (11) the resonator tube has a 2 to 10 inches in diameter and is 9 to 36 inches in length, supported by a base of appropriates dimension for the tube size selected, wherein the tube and base may be constructed of various plastics or combinations of plastics such as but not limited to polystyrene,(PS) polyethylene (PE-high and low density) polyvinyl chloride (PVC), polycarbonate (PC), polypropylene (PP), polyester such as polyethylene teraphalate and have an appropriate thickness and stiffness to give good flexural modulus values for optimum vibration. Tubes constructed outside the normal curve for a given flexural modulus are more likely to dampen vibrations, reducing their ability to transmit sound waves suitable for attracting insects. The tube may have an irregular or undulating surface that is not in total contact with the inside surface of the insect wrap 400, yet remains effective in transmitting vibrational sounds through the tube or through channels formed between the inside of the wrap and the outside of the tube; (12) the visual cue has a shape or profile of an animal head such as but not limited to: horse, cow, sheep, elephant, dog, or cat, the color of the head or profile can be, but is not limited to: black, blue, green or white, and provides an addition visual cue to attract insects and the head can be made from wood, composite and the like, or molded or stamped from various plastic known to one skilled in the art for making such models; and (13) the resonator column is covered with a sticky cover with optimum flexural modulus so not as to dampen the sound emanating from the insect(s) caught on the surface, yet have sufficient strength to avoid easy tearing.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. An insect control device for attracting and capturing insects comprising:
   a base;
   a resonator column being in the form of a hollow tube having an open first end and an open second end, the first end being coupled to the base such that the resonator column stands upright therefrom, the second end being substantially open when the resonator column is coupled to the base, wherein the resonator column is constructed and sized and shaped to resonate as a result of natural movements of insects captured on the resonator column resulting in sounds emanating from the captured insects being amplified by the resonator column which in turn serves to attract additional insects to the resonator column;
   an outer resonating element that is intimate contact with an outer surface of the resonator column and surrounds the resonator column, the outer resonating element having an adhesive material for capturing the insects, the outer resonating element being constructed such that it has a flexural modulus that does not significantly dampen the sound emanating from the insects caught on the adhesive material, wherein the outer resonating element comprises a flexible sheet that has two free edges that extend between top and bottom edges of the flexible sheet, each edge including a stiffening member that extends longitudinally along the respective edge between the top and bottom edges, the stiffening members being formed of a material that is rigid compared to the flexible sheet, the sheet being wrapped about the resonator column such that the stiffening members are in contact with one another and are disposed parallel to one another and extend radially outward from the resonator column; and
   fasteners that are attached to the stiffening members to attach the outer resonating element to the outer surface of the resonating column.

2. The insect control device of claim 1, wherein the fasteners comprise clips that protrude radially outward from the resonator column.

3. The insect control device of claim 2, wherein the clips include a pair of legs that extend from a center base section, the stiffening members being inserted between the legs to form a friction fit between the clips and the outer resonating element.

4. The insect control device of claim 2, wherein the base includes a raised center portion that is received within the open first end of the resonator column to establish a friction fit therebetween.

5. The insect control device of claim 2, wherein the stiffening members comprise flat pieces of material separate from the flexible sheet.

6. An insect control device for attracting and capturing insects comprising:
   a base; and
   a resonator column being in the form of a hollow tube having an open first end and an open second end, the first end being directly coupled to the base such that the resonator column stands upright therefrom, the second end being substantially open when the resonator column is coupled to the base, wherein the resonator column is constructed and sized and shaped to resonate as a result of natural movements of insects captured on the resonator column resulting in sounds emanating from the captured insects being amplified by the resonator column which in turn serves to attract additional insects to the resonator column;
   a flexible outer resonating element that is in intimate contact with an outer surface of the resonator column and surrounds the resonator column, the outer resonating element having an adhesive material for capturing the insects, the outer resonating element being constructed such that it has a flexural modulus that does not significantly dampen the sound emanating from the insects caught on the adhesive material, wherein the outer resonating element is open at both a first end and a second end thereof and the outer resonating element is formed of a plastic sheet that can be bent so as to allow the outer resonating element to be brought into intimate contact with the outer surface of the resonator column, wherein the outer resonating element is spaced from the open second end of the resonator column so as to not close off the open second end of the resonator column;
   wherein the resonator column is formed of a plastic material and is free of connection to any electronic components; and
   wherein an outer surface of the resonator column has an alternating striped pattern formed of two or more colors, the striped pattern comprising stripes that extend in a longitudinal direction along a height of the resonator column.

7. The insect control device of claim 6, wherein the outer resonating element being formed of the plastic sheet is disposed circumferentially about the resonator column and is in circumferential contact therewith, the outer resonating element having the adhesive material formed on an outer surface thereof.

8. The insect control device of claim 6, further including a first accessory that acts as a visual cue to attract insects, the first accessory being in the form of an object that is coupled to and extends across the open second end of the resonator column in such a way that the second end of the resonator column remains substantially open.

9. The insect control device of claim 8, wherein the object comprises a head of an animal that is formed of a color selected to attract insects.

10. The insect control device of claim 8, wherein the object is snap-fittingly mated to the second end of the resonator column.

11. The insect control device of claim 8, wherein the object is an upstanding structure that extends upwardly from the second end of the resonator column.

12. The insect control device of claim 8, wherein the object is sized and shaped to allow a prefastened outer resonating element to be placed over an outer surface of the resonator column without removal of the object from the resonator column.

13. The insect control device of claim 6, wherein the outer resonating element lies completely below the open second end of the resonator column.

14. An insect control device for attracting and capturing insects comprising:
   a base; and
   a resonator column being in the form of a hollow tube having an open first end and an open second end, the first end being directly coupled to the base such that the resonator column stands upright therefrom, the second end being substantially open when the resonator column is coupled to the base, wherein the resonator column is constructed and sized and shaped to resonate as a result of natural movements of insects captured on the resonator column resulting in sounds emanating from the captured insects being amplified by the resonator column which in turn serves to attract additional insects to the resonator column;

a flexible outer resonating element that is in intimate contact with an outer surface of the resonator column and surrounds the resonator column, the outer resonating element having an adhesive material for capturing the insects, the outer resonating element being constructed such that it has a flexural modulus that does not significantly dampen the sound emanating from the insects caught on the adhesive material, wherein the outer resonating element is open at both a first end and a second end thereof and the outer resonating element is formed of a plastic sheet that can be bent so as to allow the outer resonating element to be brought into intimate contact with the outer surface of the resonator column, wherein the outer resonating element is spaced from the open second end of the resonator column so as to not close off the open second end of the resonator column;

wherein the resonator column is formed of a plastic material and is free of connection to any electronic components;

wherein the plastic sheet has two side edges that are brought together to form a cylindrical shape, the plastic sheet being coupled to the resonator column with mechanical fasteners that engage the two side edges of the plastic sheet and allow easy installation and detachment of the outer resonating element to the resonator column.

15. The insect control device of claim 14, wherein the mechanical fasteners comprise clips that are disposed along the two side edges of the plastic sheet forming the outer resonating element being formed of the outer resonating element.

16. An insect control device for attracting and capturing insects comprising:

a base; and a resonator column being in the form of a hollow tube having an open first end and an open second end, the first end being directly coupled to the base such that the resonator column stands upright therefrom, the second end being substantially open when the resonator column is coupled to the base, wherein the resonator column is constructed and sized and shaped to resonate as a result of natural movements of insects captured on the resonator column resulting in sounds emanating from the captured insects being amplified by the resonator column which in turn serves to attract additional insects to the resonator column;

a flexible outer resonating element that is in intimate contact with an outer surface of the resonator column and surrounds the resonator column, the outer resonating element having an adhesive material for capturing the insects, the outer resonating element being constructed such that it has a flexural modulus that does not significantly dampen the sound emanating from the insects caught on the adhesive material, wherein the outer reso-nating element is open at both a first end and a second end thereof and the outer resonating element is formed of a plastic sheet that can be bent so as to allow the outer resonating element to be brought into intimate contact with the outer surface of the resonator column, wherein the outer resonating element is spaced from the open second end of the resonator column so as to not close off the open second end of the resonator column;

wherein the resonator column is formed of a plastic material and is free of connection to any electronic components;

wherein free side edges of the outer plastic sheet forming the resonating element, that extend between top and bottom edges of the plastic sheet forming the outer resonating element, are pre glued, welded or otherwise fastened to allow the outerresonating element to be placed directly over and in intimate contact with the resonator body and then secured to the resonator column by clips or by the shape of the resonator column in relation to the shape of the outer resonating element.

17. An insect control device for attracting and capturing insects comprising:

a base; and a resonator column being in the form of a hollow tube having an open first end and an open second end, the first end being directly coupled to the base such that the resonator column stands upright therefrom, the second end being substantially open when the resonator column is coupled to the base, wherein the resonator column is constructed and sized and shaped to resonate as a result of natural movements of insects captured on the resonator column resulting in sounds emanating from the captured insects being amplified by the resonator column which in turn serves to attract additional insects to the resonator column;

a flexible outer resonating element that is intimate contact with an outer surface of the resonator column and surrounds the resonator column, the outer resonating element having an adhesive material for capturing the insects, the outer resonating element being constructed such that it has a flexural modulus that does not significantly dampen the sound emanating from the insects caught on the adhesive material, wherein the outer resonating element is open at both a first end and a second end thereof and the outer resonating element is formed of a plastic sheet that can be bent so as to allow the outer resonating element to be brought into intimate contact with the outer surface of the resonator column, wherein the outer resonating element is spaced from the open second end of the resonator column so as to not close off the open second end of the resonator column;

wherein the resonator column is formed of a plastic material and is free of connection to any electronic components; wherein clips are disposed along two free side edges of the plastic sheet forming the outer resonating element that extend between top and bottom edges of the plastic sheet forming the outer resonating element, the two side edges of the plastic sheet forming the outer resonating element being bent radially outward relative to the resonator column and brought into contact with one another such that the two side edges overlap one another and are secured to each other to form a snug fitting outer resonating element.

* * * * *